United States Patent [19]

Kuroda et al.

[11] Patent Number: 5,354,629
[45] Date of Patent: Oct. 11, 1994

[54] MONAQUEOUS ELECTROLYTE BATTERY

[75] Inventors: Akira Kuroda; Atsushi Yamano; Satoshi Narukawa; Yuichi Yokoyama, all of Sumoto, Japan

[73] Assignee: Sanyo Electric Co., Ltd., Osaka, Japan

[21] Appl. No.: 959,128

[22] Filed: Oct. 9, 1992

[30] Foreign Application Priority Data

Oct. 9, 1991 [JP] Japan .................. 3-262219
Jul. 31, 1992 [JP] Japan .................. 4-205212

[51] Int. Cl.⁵ ................... H01M 2/22; H01M 4/64
[52] U.S. Cl. ........................... 429/94; 429/161; 429/211
[58] Field of Search .................... 429/94, 161, 211

[56] References Cited

U.S. PATENT DOCUMENTS

| | | | |
|---|---|---|---|
| 4,830,940 | 5/1989 | Keister et al. | 429/94 |
| 4,863,815 | 9/1989 | Chang et al. | 429/94 |
| 4,963,445 | 10/1990 | Marple et al. | 429/94 |
| 5,047,300 | 9/1991 | Juergens | 429/94 |
| 5,114,804 | 5/1992 | Stiles et al. | 429/94 |
| 5,176,968 | 1/1993 | Blasi et al. | 429/94 |

FOREIGN PATENT DOCUMENTS 53-29933 7/1978 Japan .
63-6988 2/1988 Japan .
4-62755 2/1992 Japan .

Primary Examiner—Cecilia Tsang
Attorney, Agent, or Firm—Wenderoth, Lind & Ponack

[57] ABSTRACT

The nonaqueous electrolyte battery of this invention is provided with a spiral electrode unit comprising a separator laminated between a cathode and an anode rolled into a spiral shape having anode around the outer perimeter. An anode terminal tab disconnects from the outermost one circumference of anode residue after discharge to prevent residual anode deposition on the cathode when power is overdrawn.

6 Claims, 12 Drawing Sheets a b.

a.

b.

c.

a.

b.

c.

a.

b.

OUTERMOST PERIPHERY

NONAQUEOUS ELECTROLYTE BATTERY

BACKGROUND OF THE INVENTION

This invention relates to a nonaqueous electrolyte battery provided with a cathode having an active material such as a metal oxide or sulfide, an anode comprising a consumable metal such as lithium, and a separator rolled into a spiral electrode unit.

In general, in a lithium battery containing a spiral shaped electrode unit within an exterior package, the anode is placed around the outermost periphery of the electrode unit to make sufficient use of the active cathode material. A nonaqueous electrolyte battery having the anode around the outermost periphery of the electrode unit is described in Japanese patent disclosures 53-29933 (1978) and 63-6988 (1988).

In a spiral electrode unit of this type, even after battery discharge, one turn of the outermost peripheral anode which faces the cathode on only one side remains only half consumed and unable to react further. This is because the anode thickness is designed for anode depletion at discharge resulting from both sides of the anode reacting with the cathode material.

Prior art batteries connected the anode terminal tab to the remaining one turn of the outer peripheral anode. For this reason, these batteries suffered from internal shorting problems when completely discharged by forced discharge. Namely, since the anode terminal tab was connected to the remaining outermost part of the anode, conduction occurred through the remaining anode when power was overdrawn from the battery, thereby exceeding the reaction limit of the active cathode material. This caused migration of the anode material to the surface of the cathode facing the remaining anode and deposition of the anode material on that cathode surface. Ultimately, the deposited anode material penetrated through the separator causing conduction between the cathode and the anode.

To deal with this problem, prior art nonaqueous electrolyte batteries had anodes made as thin as possible. This reduces the amount of active anode material remaining in the outermost turn of the anode after discharge and suppresses lithium deposition on the cathode.

However, although the thin anode battery can reduce lithium deposition on the cathode during complete discharge, anodes are easily broken during the electrode rolling process and manufacturability is degraded. Further, by reducing the anode thickness, the actual capacity of the anode is reduced bringing about a large performance degradation.

Batteries with both the cathode and anode made thin and the electrode area increased can reduce the amount of lithium deposited per unit area of cathode because the electrode surface area is large. However, to reduce lithium deposition per unit area, these batteries require large reductions in both cathode and anode thicknesses. With the opposing electrode surface areas increased more than necessary, internal resistance is reduced and large currents flow when the battery is shorted externally. Large currents cause battery overheating, and internal shorting due to separator melting becomes a concern.

The present invention was developed to solve the previously mentioned problems. It is thus a primary object of the present invention to provide a nonaqueous electrolyte battery that prevents anode migration to, and deposition on the cathode surface induced by conditions such as overdrawing power from the battery, by disconnecting the outermost turn of the anode remaining after discharge from the anode terminal tab.

SUMMARY OF THE INVENTION

The nonaqueous electrolyte battery of this invention is provided with a spiral electrode unit having an anode outer perimeter and comprising a belt shaped cathode, a belt shaped anode made of a consumable metal that depleted during the discharge reaction, and a separator rolled in between the cathode-anode laminate. Further, the battery of the present invention has the following unique structure. Namely, the nonaqueous electrolyte battery of this invention has an anode terminal tab attached to the anode at a position at least one turn away from the outside end of the rolled anode, and that anode terminal tab is disconnected from the anode remaining in the outermost periphery after discharge. Therefore, the remaining anode does not conduct when power is overdrawn from the battery, avoiding deposition of the remaining anode on time cathode, and preventing internal shorts.

Further, to insure that the anode terminal tab of the nonaqueous electrolyte battery of this invention disconnects from the anode remaining after discharge, it is desirable for the outermost end of time rolled cathode to protrude beyond the outermost end of the rolled anode. With a spiral electrode unit of this structure, the protruding end of the rolled cathode causes local acceleration of anode depletion thereby allowing reliable separation of time anode terminal tab from the remaining anode.

It is also desirable for the nonaqueous electrolyte battery of this invention to have terminal separation holes opened through a portion of the anode to separate the anode terminal tab from time anode remaining after discharge. Terminal separation holes insure separation of time anode terminal tab from the anode remaining after discharge by initially removing part of the anode covered by the anode terminal tab. This region sees reduced depletion due to coverage.

DETAILED DESCRIPTION OF THE INVENTION

Embodiment No. 1

An embodiment of the present invention is explained in detail in the following.

Figure 1:
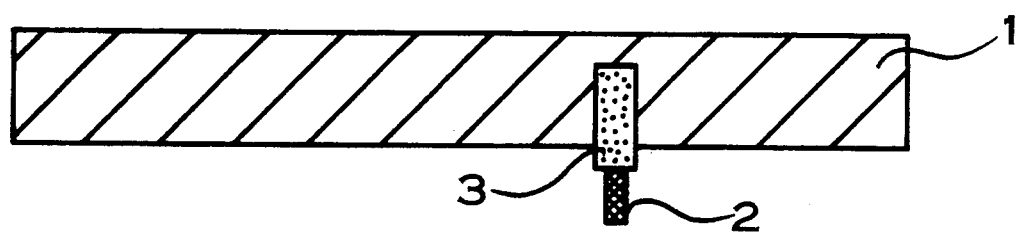
FIG. 1 is a plan view showing a method of anode construction of the present invention.

Turning to FIG. 1, a method of anode construction is shown. This anode 1 is metallic lithium cut to a thickness of 0.2 mm, a width of 23 mm, and a length of 230 mm. A rectangular anode terminal tab 2 is connected to the anode 1 by tape 3 on both sides. The anode terminal tab 2 is nickel (Ni) sheet 3 mm wide and 21 mm long. The anode terminal tab 2 is located 180 mm down the length of the anode 1.

Figure 2:
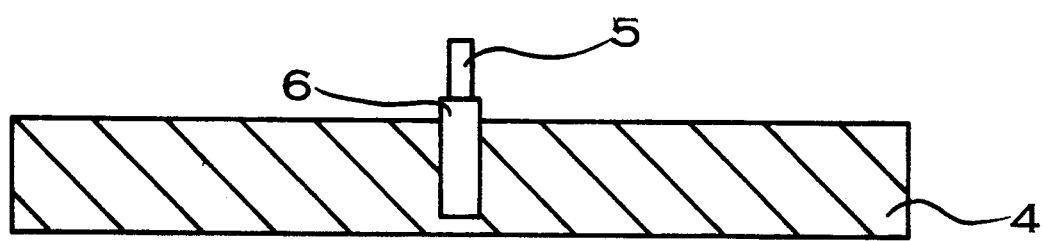
FIG. 2 is a plan view showing a method of cathode construction of the present invention.

Next, a cathode layout is shown in FIG. 2. The cathode 4 is fabricated in the following manner. First, 890 g of manganese dioxide is mixed with 80 g of graphite for 30 min in an automated mortar. Trifluoroethylene is added to the mixture and further mixed for 10 min. Then 15 g of polyvinyl alcohol (PVA) dissolved in 110 g of pure water is added and mixed to a slurry. This slurry coating is applied to a cathode core, dried, rolled, and cut to produce a 0.43 mm thick, 26 mm wide, and 230 mm long cathode 4. Here, 0.1 mm thick lath processed SUS304 stainless steel is used as the cathode core. A 5 mm wide, 21 mm long region at the center of the above processed cathode 4 is stripped of coating, and a 35 mm long 3 mm wide, 0.15 mm thick strip of SUS304 stainless steel sheet is spot welded to that stripped region of exposed cathode core to form the cathode terminal tab 5. The cathode terminal tab 5 is covered with tape 6 except for its protruding end. The cathode is heat treated at 230° C. to remove moisture, and cooled in a dehydrated atmosphere. The cathode and anode made in the above fashion are sandwiched around a 29 mm wide polyethylene porous membrane separator. This laminate is rolled into a spiral shape, and the entire surface of the outermost circumference is covered with tape to form an electrode unit W.

FIGS. 3a and b are cross-sectional side views showing the electrode unit W before discharge (FIG. 3a) and after discharge (FIG. 3b). In these figures, the components are numbered as follows. 31 is the anode, 34 is the cathode, 37 is the separator, 32 is the anode terminal tab, and 33 is tape holding the anode terminal tab 32 on the anode 31.

As shown In this figure of the electrode unit W, only one surface (the under surface in FIG. 3) of the end A of the rolled cathode 34 opposes the anode 31. Consequently, the anode region 31a that directly opposes the inside surface of the end A of the rolled cathode 34, is rapidly consumed during battery discharge. In this manner, as shown in the spiral electrode unit W of FIG. 3b, since the anode region 31a opposite the end A of the rolled cathode reacts completely and is entirely consumed at the later stages of discharge, electrical power from lithium remaining in the outermost periphery of the anode 31 cannot be collected at the anode terminal tab 32 which is connected more than one circumference (or turn) from the end of the rolled anode 31. Therefore, when power is overdrawn from the battery, conduction does not take place through lithium remaining in the outermost periphery, internal shorts do not result from dendritic (needle-like) lithium deposition on the cathode surface, and the battery can be used safely.

Embodiment No. 2

Another embodiment of the present invention is explained in detail in the following.

Figure 4:
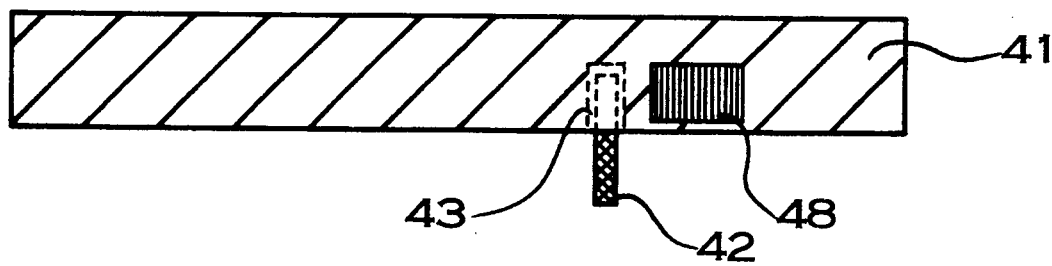
FIG. 4 is a plan view showing another method of anode construction of the present invention.

Turning to FIG. 4, another method of anode construction is shown. This anode 41 is metallic lithium cut to a thickness of 0.2 mm, a width of 23 mm, and a length of 230 mm. A 0.1 mm thick, 3 mm wide, and 21 mm long Ni anode terminal tab 42 is attached to the anode 41. The anode terminal tab 42 is held in connection with the anode 41 by tape 43, and an ion impervious insulator material 48 in tape form is attached to the anode 41 beyond the tape which is 43 towards the end of the anode 41. Polyethylene-terephthalate tape 9 mm wide, 14 mm long, and 0.06 mm thick is used as the insulator material 48.

A cathode processed by the same method as embodiment No. 1 is used for this embodiment. This cathode and anode are rolled around a 29 mm wide polyethylene porous membrane separator, and the entire surface of the outermost circumference is covered with tape to form the spiral electrode unit X.

Figure 6:
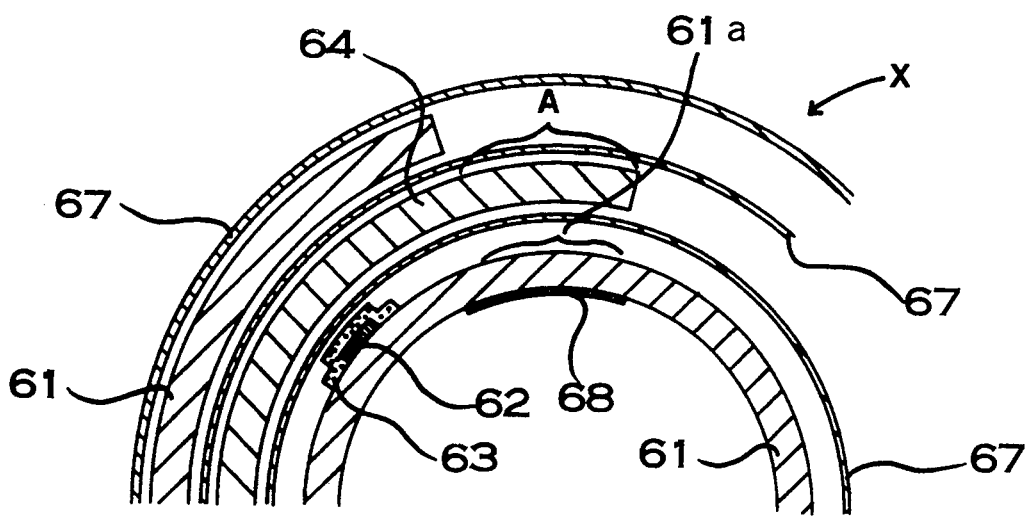
FIG. 6a is a cross-sectional side view showing an electrode unit X of the present invention.
FIG. 6b is a cross-sectional side view showing the electrode unit X after 50% battery discharge.
FIG. 6c is a cross-sectional side view showing the electrode unit X In the later stages of discharge.
Figure 6:
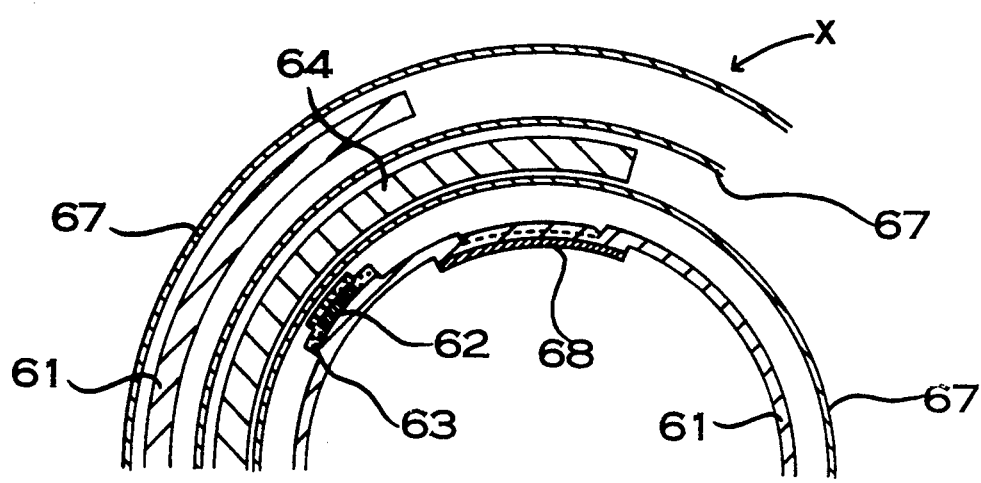
Figure 6:
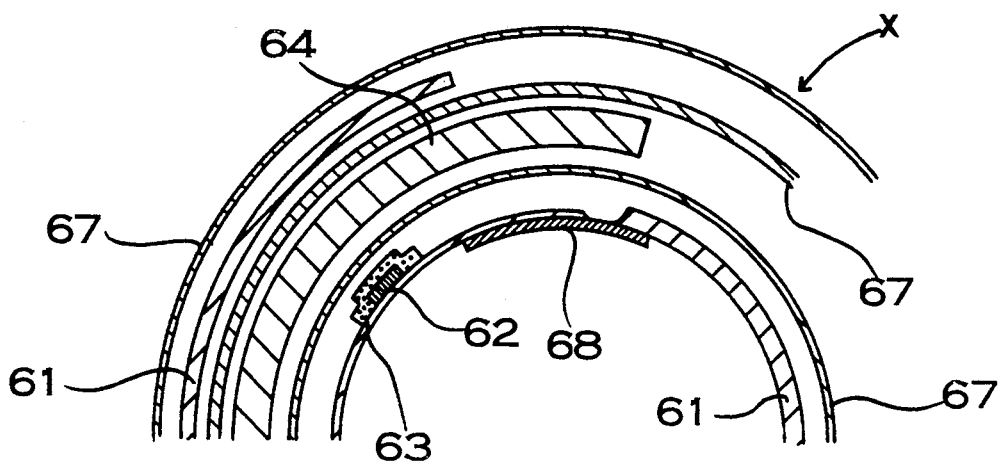

FIGS. 6a, b and c cross-sectional side views showing a spiral electrode unit X. Cathode change accompanying battery discharge is shown in FIG. 6a through FIG. 6c. In these figures, the components are numbered as follows. 61 is the anode, 64 is the cathode, 67 is the separator, 62 is the anode terminal tab, 63 is tape holding the anode terminal tab 62 on the anode 61, and 68 is the ion impervious insulator material.

This spiral electrode unit X has the following characteristics.

①  The end region A of the rolled cathode 64 reacts only with the anode region 61a rolled inside. This is because the cathode end region A protrudes beyond the end of the rolled anode 61.

②  The anode terminal tab 62 collects charge at a position greater than one circumference in from the end of the rolled anode 61.

③  Ion impervious insulator material 68 is disposed to cover at least the entire inside surface of the region of anode 61a opposite the end region A of the cathode 64.

The spiral electrode unit X has the ion impervious insulator material 68 disposed over more of the inside of the anode than the region 61a opposite the cathode end region A, and has the anode terminal tab 62 connected in the location shown in FIG. 6a. The spiral electrode unit X changes as discharge progresses from FIG. 6a to FIG. 6c. As shown in FIG. 6b after 50% discharge of the spiral electrode unit X, more anode 61 (inside of the outermost one turn of the anode) that opposes cathode 64 on both sides is consumed resulting in nonuniformity. In particular, the anode region 61a opposite the end region A of the cathode 64 is rapidly consumed resulting in more anode depletion.

As shown by the dotted line in FIG. 6b, the inner region of the anode which has no ion impervious insulator material 68 depletes faster than the region with the insulator material 68 because it faces cathode 64 on both surfaces. As shown in FIG. 6c when discharge progresses to the later stages, part of the anode region 61a with ion impervious insulator material 68 is completely consumed due to cathode end region edge effect. As a result, the anode terminal tab 62 is separated from lithium remaining in the outermost one turn of anode 61 and does not electrically conduct with it.

Therefore, even when power is overdrawn from this spiral electrode unit X, lithium in the outermost one turn of the anode does not ionize and migrate to the cathode, lithium dendrite (needle-like lithium deposition on the cathode) does not form, and safe battery operation is insured.

Embodiment No. 2 is an example of an application of embodiment No. 1. The spiral electrode unit X of embodiment No. 2 controls cathode edge effect by disposition of ion impervious insulator material 68 on the inside surface of the anode region 61a which is opposite the end A of the rolled cathode 64. This disposition of ion impervious insulator material 68 allows the anode region 61a to react only with the cathode opposite its outermost surface. Hence, the anode terminal tab 62 of this spiral electrode unit X disconnects from the outermost one turn of the anode 61 just prior to complete discharge. This prevents degradation of discharge characteristics and increases battery capacity compared with embodiment No. 1. This is because the ion impervious insulator material 68 of the spiral electrode unit X controls anode consumption thereby delaying separation of the anode terminal tab from the lithium remaining in the outermost one turn of the anode.

Figure 5:
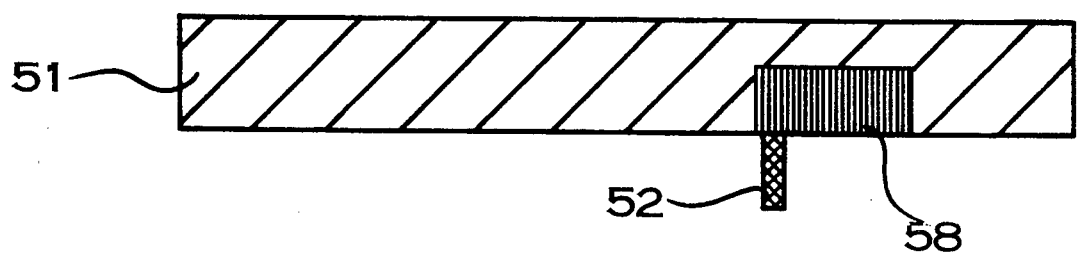
FIG. 5 is a plan view showing still another method of anode construction of the present invention.

Further, as shown in the anode of FIG. 5, the insulator material can also serve as the terminal tab tape. There is no compromise in functionality when the anode terminal tab 52 is attached with ion impervious insulator material 58.

It should be noted that the insulator material is simply ion impervious material used as a barrier, and any type of porous sheet, woven material, or nonwoven material could have the same effect. Consequently, the insulator material is not strictly limited to insulating tape.

Embodiment No. 3

Still another embodiment of the present invention is explained in detail in the following.

Figure 7:
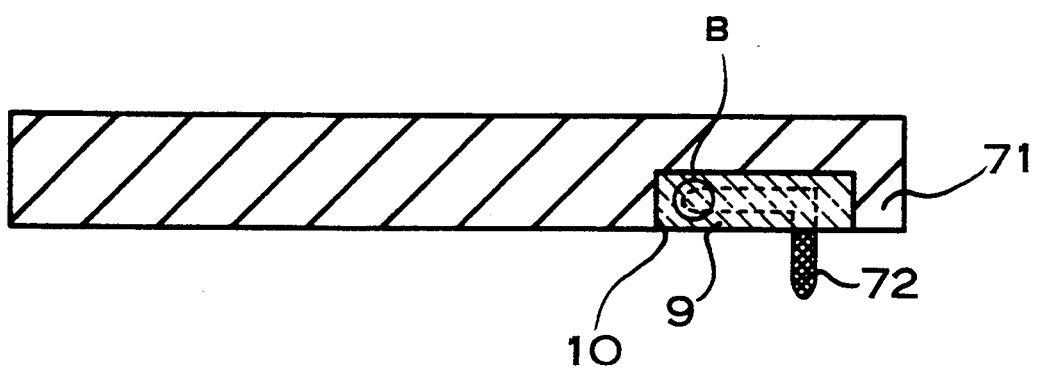
FIG. 7 is a plan view showing another method of anode construction of the present invention.

Turning to FIG. 7, another method of anode construction is shown. This anode 71 is metallic lithium cut to a thickness of 0.2 mm, a width of 23 mm, and a length of 230 mm. Insulating film 9 is attached near the end of the metallic lithium. An anode terminal tab 72 is disposed on top of the insulating film 9. The anode terminal tab 72 is aligned over the insulating film such that only its end region B contacts the lithium anode. The anode terminal tab 72 is an L-shaped Ni sheet which is 4 mm wide, 25 mm long in one direction, and 19 mm long in the other. The end 5 mm of the 25 mm long part of the anode terminal tab 72 is contacted against the metallic lithium anode. The protruding part of the L-shaped anode terminal tab 72 is positioned 200 mm from the end of the metallic lithium anode. The anode terminal tab 72 is connected to the anode 72 by covering it with sticky tape 10 (made of polyethylene-terephthalate).

A cathode processed by the same method as embodiment No. 1 is used for this embodiment. This cathode and anode are rolled around a 29 mm wide polyethylene porous membrane separator, and the entire surface of the outermost circumference is covered with tape to form a spiral electrode unit Y.

FIGS. 8a, b and c are cross-sectional side views showing the spiral electrode unit Y. Cathode change accompanying battery discharge is shown in FIG. 8a through FIG. 8c.

This spiral electrode unit Y has the following characteristics, ①  through ②, concerning the position and configuration of the anode terminal tab 82.

① The end A of the rolled cathode 84 reacts only with anode 81 that is rolled inside.

② The anode terminal tab 82 is connected to, and collects charge at a position near center, greater than or equal to one turn from the end of the rolled anode 81.

③ The anode terminal tab 82 is disposed on the inside (rolled) surface of the anode 81.

④ The outermost turn of the anode 81 is electrically isolated frown the anode terminal tab 82 by the insulating film 89.

Figure 10:
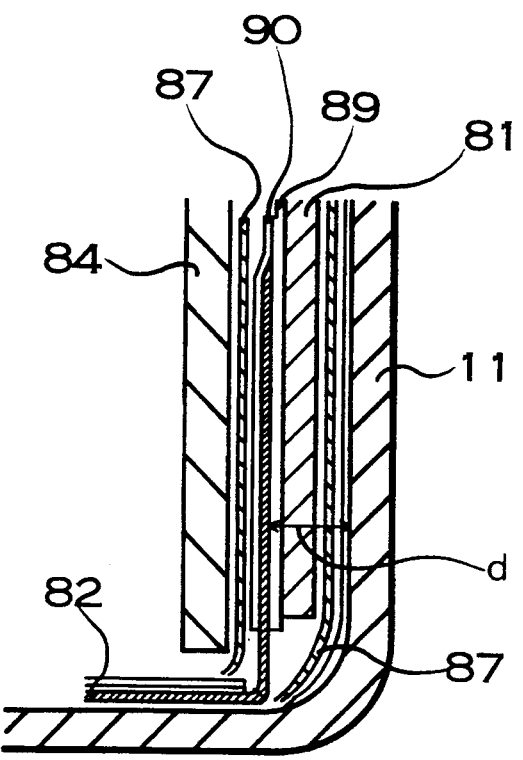
FIG. 10 is a cross-sectional side view showing the electrode unit Y of the present invention inserted within an exterior package.

⑤ As shown in FIG. 10, the protruding end of the anode terminal tab 82 connects with time exterior package 11 through a cathode-less part of the outer periphery of the spiral electrode unit Y.

Figure 9:
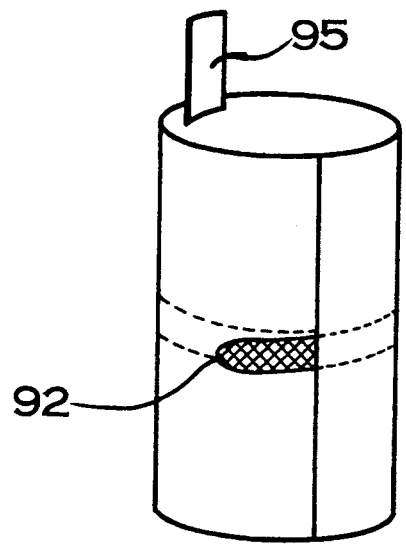
FIG. 9 is a side view of a terminal contact embodiment of the electrode unit of the present invention.

It is not always necessary for the anode terminal tab to be L-shaped. It is also possible to contact the exterior package with an anode terminal tab 92 such as shown in FIG. 9, which is not L-shaped but is linear and has an end that extends in the direction of electrode winding and protrudes out from the end of the rolled anode.

As shown in FIG. 8b, the spiral electrode unit Y of FIGS. 8a, b and c has the characteristic that consumption of the anode region D that is opposite the edge C of the cathode end region is particularly fast. The dotted line of FIG. 8b shows anode 81 consumption in regions without insulating film 89 and sticky tape 90. When the rolled end of the cathode of the spiral electrode unit Y is wrapped with tape, anode reaction opposite the tape-cathode boundary is particularly violent.

In accordance with the structure shown in FIGS. 8a, b and c since insulating film 89 and sticky tape 90 are attached to the inside of the anode 81, the anode surface in that region cannot react with the cathode 84 rolled inside. For this reason, the region of the anode 81 covered with insulating film 89 and the rolled cathode end region A outside such region are consumed in a 1:1 ratio of the quantity of active cathode material to the quantity of active anode material. Elsewhere, because anode regions without tape react with the cathode on both sides, the ratio of the quantity of active cathode material to the quantity of active anode material is 1.5:1, so the quantity of cathode active material has extra strength. Further, the anode region D opposite the edge C of the cathode 84 depletes rapidly due to the edge effect. Therefore, as shown by region D in FIG. 8c, the anode terminal tab 82 is separated from the residual outer turn of the lithium with certainty in the later stages of battery discharge. Hence, there is no conduction between the anode terminal tab 82 and the outermost turn of the anode in the later stages of battery discharge, no lithium dendrite growth due to overdrawing battery power, and battery safety is insured.

Note that if the previously mentioned conditions, ①  through ④, are not fully met, the anode terminal tab can continue to connect with the outermost turn of the anode, and the overdrawing of power from the battery can be unsafe.

FIG. 10 is a cross-sectional side view of the spiral electrode unit Y inserted within the exterior package 11. In accordance with the structure previously mentioned in ⑤ and as shown in FIG. 10, the distance d between the protruding end of the anode terminal tab 82 and the exterior package is short, preventing bending of the anode terminal tab 82 due to vibration, and thereby avoiding internal shorts.

Example for Comparison No. 1

For comparison, a case is described in which the anode terminal tab is connected to the outermost turn of the metallic lithium anode. The same cathode as embodiment No. 1 is used A metallic lithium anode is cut to 0.2 mm thick 23 mm wide, and 230 mm long, and a 3 mm wide and 21 mm long rectangular Ni sheet anode terminal tab is attached to it.

This cathode and anode are rolled around a 29 mm wide polyethylene porous membrane separator, and the entire surface of the outermost turn is covered with tape to form the electrode unit Z. Cross-sectional side views of this electrode unit Z are shown in FIGS. 11a and b.

Figure 11:
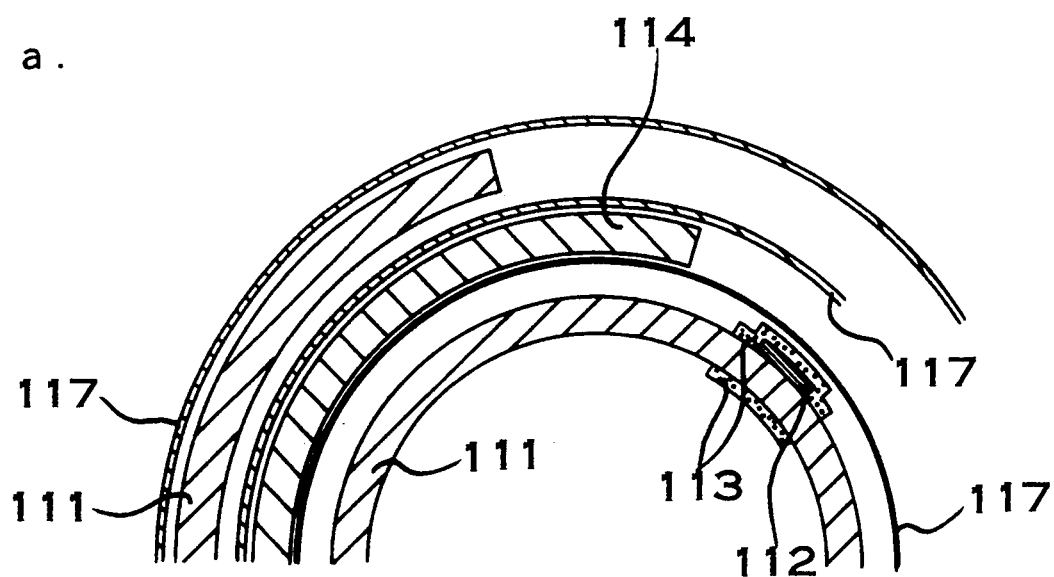
FIG. 11a is a cross-sectional side view showing an electrode unit Z for comparison.
FIG. 11b is a cross-sectional side view showing the electrode unit Z in the later stages of discharge.
Figure 11:
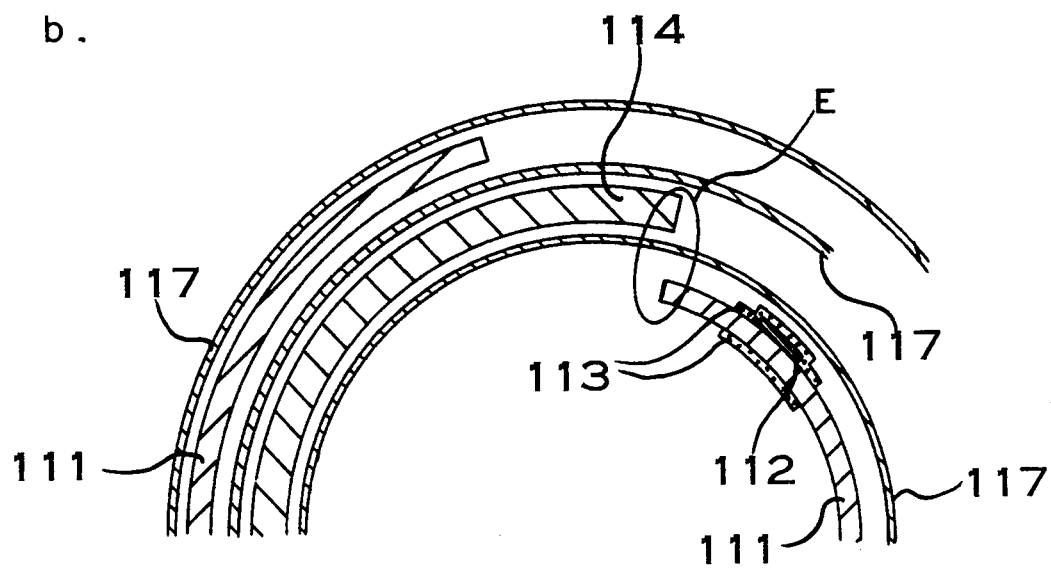

FIG. 11a shows the spiral electrode unit before discharge, where 111 is the anode, 112 is the anode terminal tab, 113 is tape, and 114 is the cathode. The anode terminal tab 112 is connected to the outermost one turn of the anode and protrudes out to the bottom of the exterior package.

FIG. 11b is a cross-sectional side view of the spiral electrode unit Z in the later stages of discharge. Cathode opposite anode on both sides is consumed and separated at region E. Lithium in the outermost circumference remains with the anode terminal tab connected. When power is overdrawn from the battery in this situation, residual lithium in the outermost periphery electrically conducts via the anode terminal tab 112. Therefore, residual lithium ionizes and deposits on the completely reacted cathode. This active lithium deposition breaks through the separator to the anode and causes internal shorting and the possibility of battery fire due to sparks during shorting.

Figure 12:
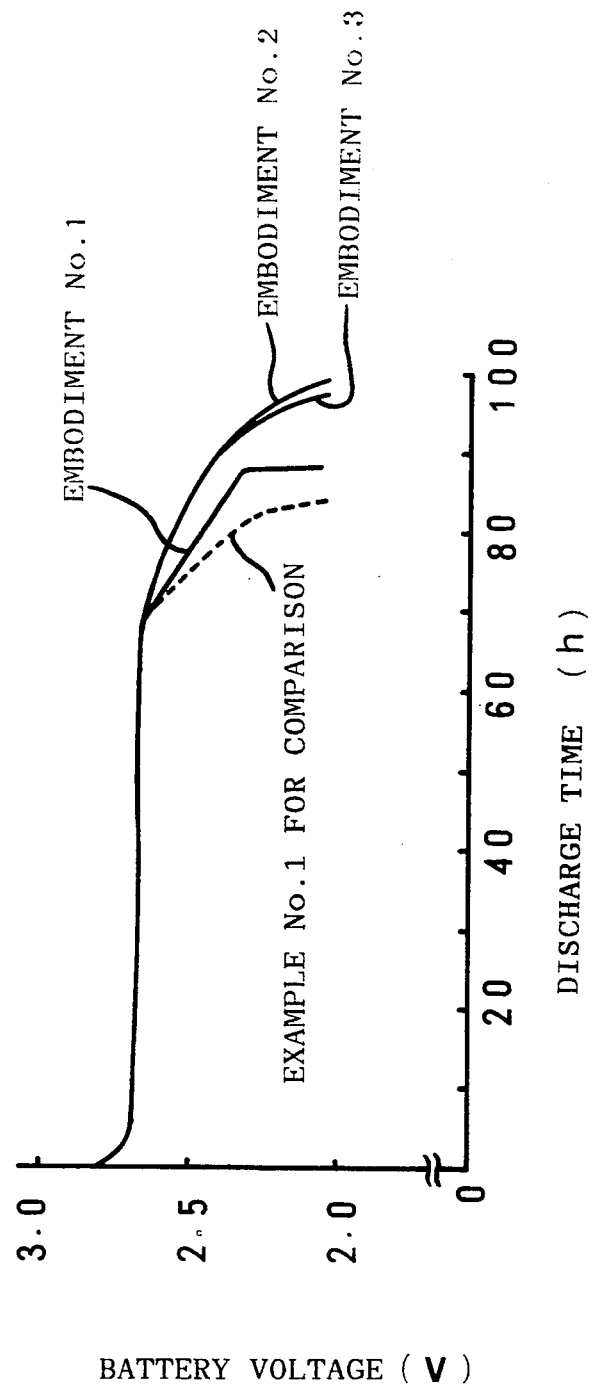
FIG. 12 is a graph showing discharge characteristics of the present invention and another example for comparison.

The above electrode units, W through Z, were assembled into batteries with diameters, $\phi = 16.5$ mm, and heights, $h = 33.5$ mm, and the results of their discharge at 23° C. through 200 $\Omega$ is shown in FIG. 12. As shown in this graph, the batteries of embodiment No. 1 through embodiment No. 3 had equal or better discharge characteristics than the example for comparison. According to this result, the embodiments of the present invention produce safe batteries without degradation of discharge characteristics.

Embodiment No. 4

Prototype nonaqueous electrolyte batteries using organic electrolyte were fabricated by the following process. The prototypes made were $MnO_2$/Li nonaqueous electrolyte batteries.

The cathode is made by the same method as embodiment No. 1. However, the cathode sheet dimensions are 1.15 mm thick, 51 mm wide, and 385 mm long. A 5 mm by 25 mm region at the center of the cathode sheet is stripped, an SUS304 stainless steel terminal is spot welded there, and the stripped region is covered with glass tape. The terminal is 0.15 mm thick, 3 mm wide, and 35 mm long.

Five types of prototype anodes were made according to the following conditions. Of the 5 different prototypes, the anode of embodiment No. 4 is used in a nonaqueous electrolyte battery as an embodiment of the present invention. Four prototype anodes were made for comparison to clearly show the outstanding characteristics of the embodiment No. 4 prototype anode.

Embodiment No. 4 Anode

Figure 3:
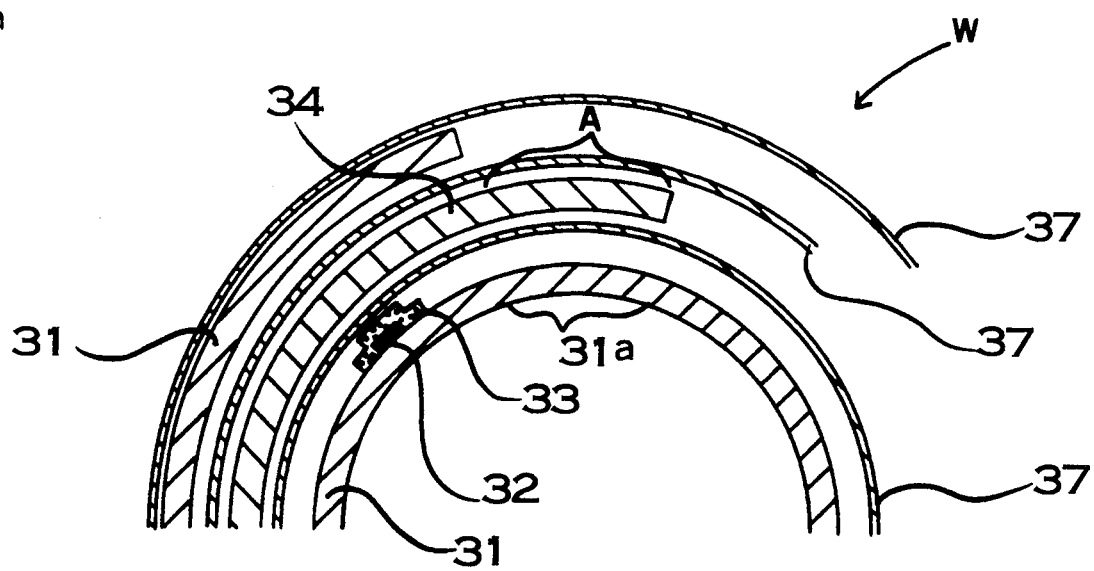
FIG. 3a is a cross-sectional side view showing an electrode unit W of the present invention.
FIG. 3b is a cross-sectional side view showing the electrode unit W in the later stages of discharge.
Figure 3:
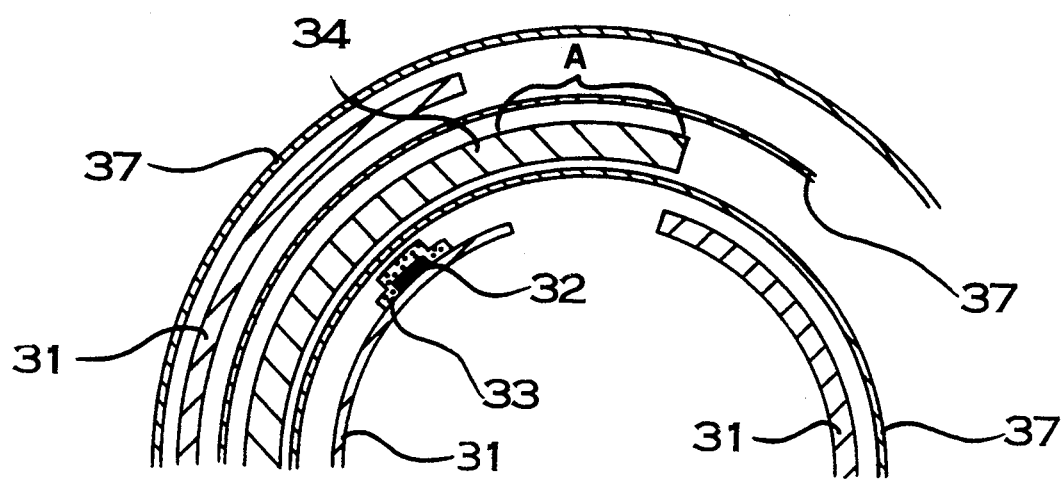
Figure 14:
FIG. 14 is an edge view showing the anode of FIG. 13.

As shown in FIG. 3 and FIG. 14, a prototype cathode 131, provided with a terminal separating hole 138, was made in the following configuration.

① The anode 131 is a 0.46 mm thick lithium sheet cut to a width of 48 mm and a length of 435 mm.

② A Ni anode terminal tab 132 is taped to the lithium sheet with glass tape. The anode terminal tab 132 is 0.15 mm thick, 3 mm wide, and 35 mm long on a side.

③ A 7 mm diameter terminal separating hole 138 is provided through the anode 70 mm from the end of the anode which is rolled last. The terminal separating hole 138 is positioned at the boundary of the connecting region of the anode terminal tab 132 to the anode 131 and an insulating film insulating material 139.

Figure 13:
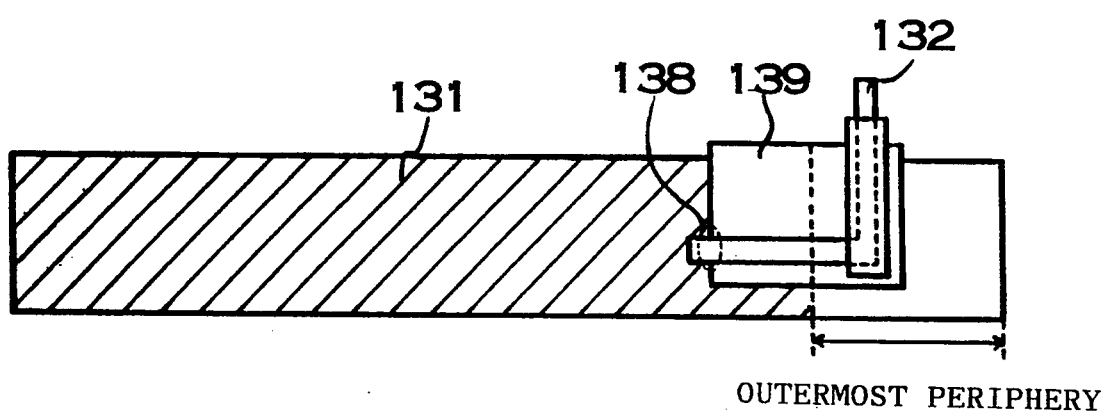
FIG. 13 is a plan view showing another method of anode construction of the present invention.

④ As shown In FIG. 13 an insulating film used as an insulating material 139 is attached between the anode terminal tab 132 and the anode 131. The Ni anode terminal tab 132 is taped on top of the insulating material 139 with glass tape, and one end of the anode terminal tab 132 is connected to the anode 131 inside of the outer perimeter region.

The anode terminal tab 132 is L-shaped. Each arm of the L-shaped anode terminal tab 132 is 0.15 mm thick, 3 mm wide, and 35 mm long. The anode terminal tab 132 is taped to the anode 40 mm from the end of the anode which is rolled last, and, when rolled, the anode terminal tab 132 is next to the outermost periphery of the anode with insulating film in between.

Figure 15:
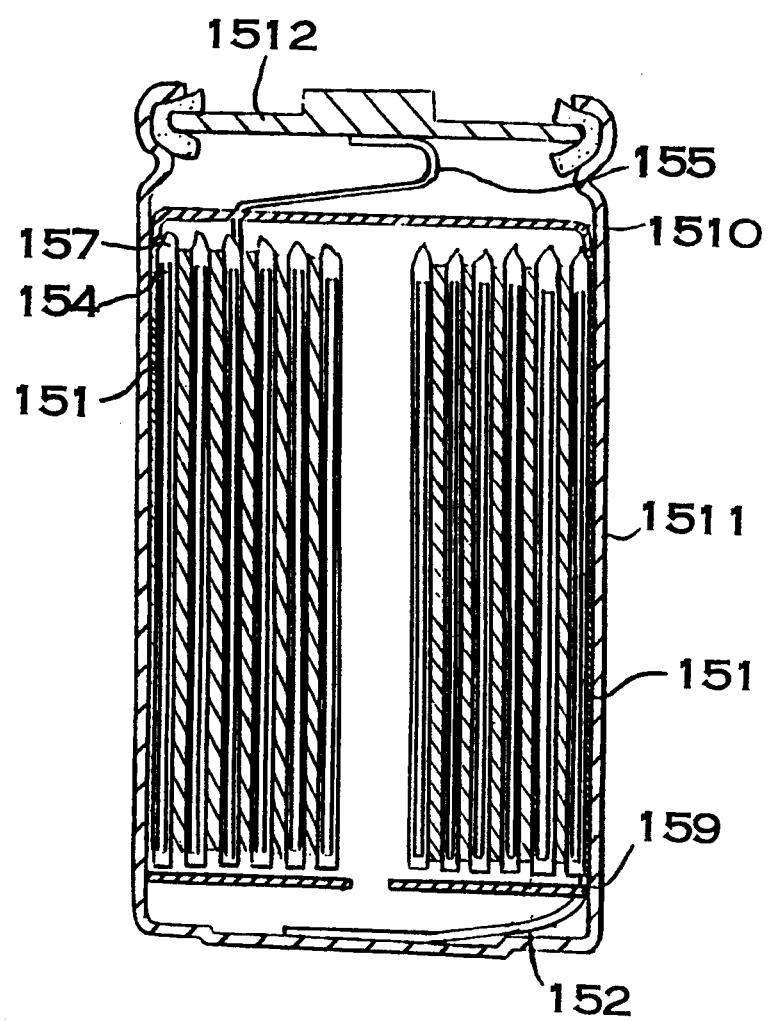
FIG. 15 is a cross-sectional side view showing the electrode unit of the present invention enclosed within an exterior package.

Using the cathode and anode produced by the above process, a prototype battery of the configuration shown in FIG. 15 is made as follows.

① An electrode unit is made by rolling a laminate of cathode 154 and anode 151 sandwiched around a separator 157.

② An insulating sheet 159 is disposed along the bottom surface of the electrode unit which is inserted into an exterior package 1511 with an outside diameter $\phi = 33.5$ mm, and a height $h = 61$ mm.

③ The anode terminal tab 152 is connected to the bottom surface of the exterior package 1511 by spot welding.

④ Next an insulating sleeve 1510 is placed around the electrode unit, and the cathode terminal 155 is spot welded to the bottom surface of the battery cap 1512 after grooving the top of the exterior package 1511.

⑤ After filling the battery with 12 milliliters (ml) of electrolytic solution, the battery is capped closed.

A mixture of equal amounts of propylene carbonate and dimethoxy ethane, with 1 mole/liter of lithium perchlorate added into solution, is used as the electrolytic solution.

After overdrawing power from the prototype batteries at a discharge current adjusted to be 3 A, they were disassembled and the difference in lithium deposition on the cathode was investigated. Results showed that the battery using the prototype anode embodiment of this invention had extremely small amounts of lithium deposition and an extremely small deposition area.

Figure 16:
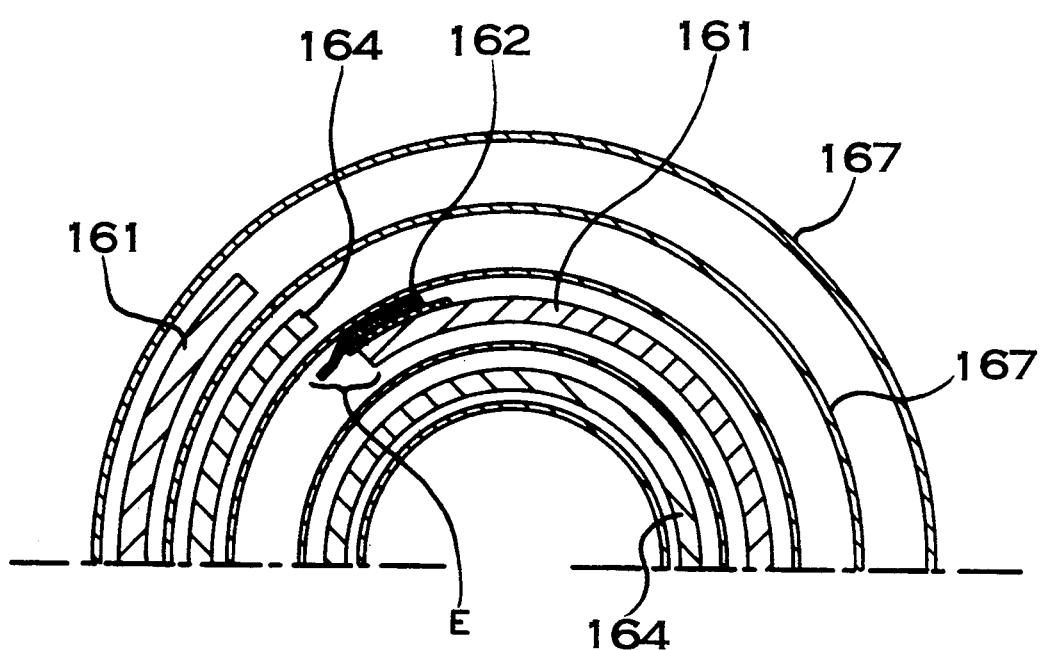
FIG. 16 is a cross-sectional side view showing an electrode unit using the anode of FIG. 13 in the later stages of discharge.

Further, with the same 3 A discharge current, batteries just prior to power overdraw were prepared, and their cross-sections were investigated. The cross-section of the electrode unit For the battery of embodiment No. 4 is shown in FIG. 16. This figure shows the completely discharged electrode unit using the anode of embodiment No. 4 in cross-section.

As shown in FIG. 16, in the electrode unit using the anode of embodiment No. 4, the outermost turn of the anode 161 separates from the anode terminal tab 162 during the later stages of discharge (they are separated by insulating film in the figure). Therefore, the detrimental effect of the active anode material depositing on the cathode is avoided.

Figure 8:
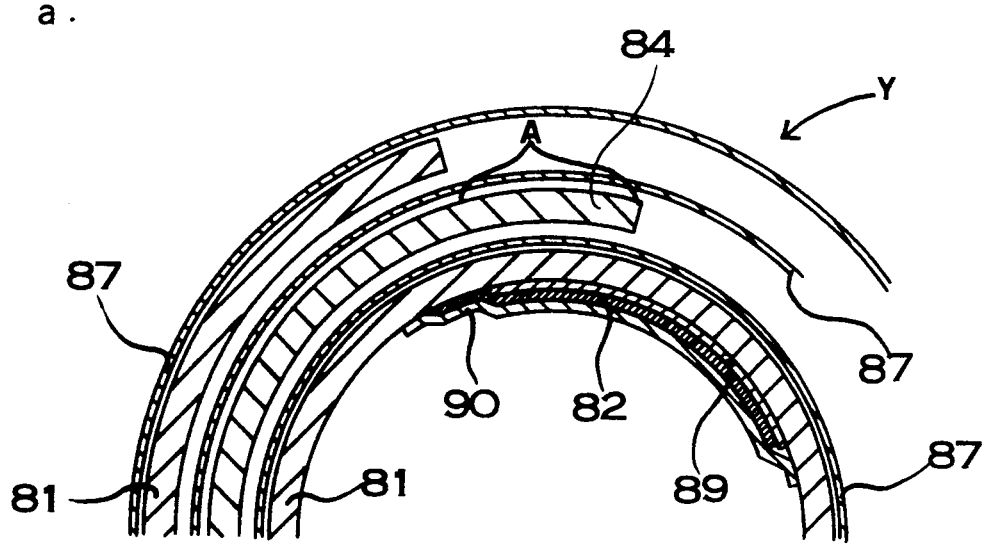
FIG. 8a is a cross-sectional side view showing an electrode unit Y of the present invention.
FIG. 8b is a cross-sectional side view showing the electrode unit Y after 50% battery discharge.
FIG. 8c is a cross-sectional side view showing the electrode unit Y In the later stages of discharge.
Figure 8:
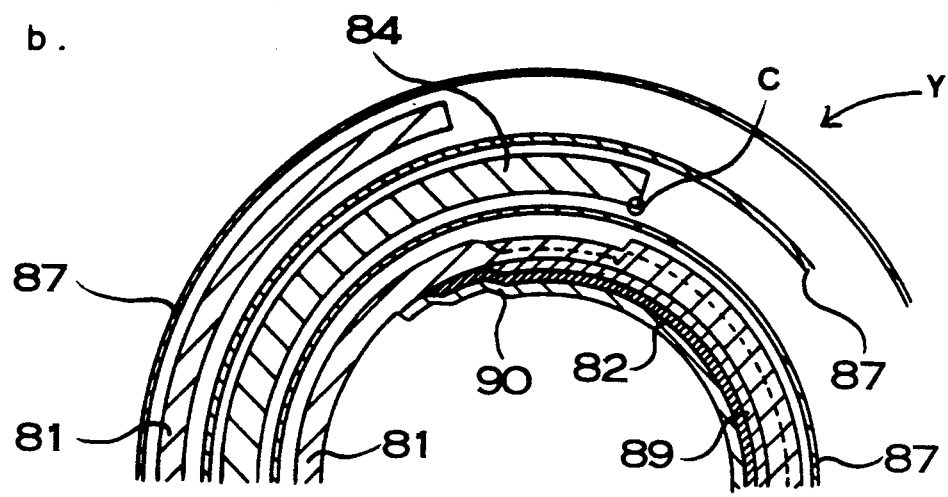
Figure 8:
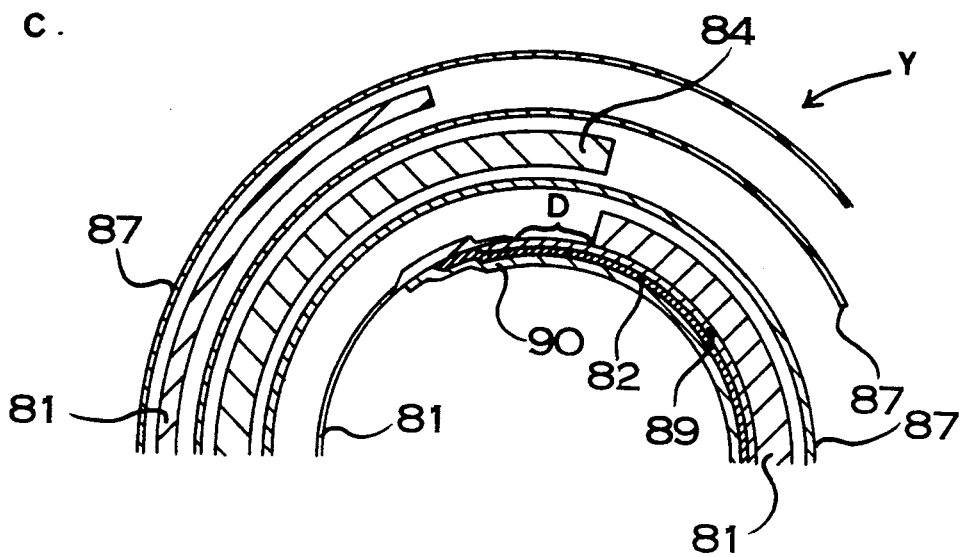

In an electrode unit with the anode terminal tab connected on the outer surface of the anode, the region of the anode 161 in the shadow of the L-shaped terminal tab (region E in FIG. 16) opposes the cathode only on its inside surface. In an electrode unit of this type without a terminal separating hole, lithium remains under the shadow of the anode terminal tab 162 even when the battery is in a state of complete discharge, and the connection between the outermost turns the of lithium and the anode terminal tab 162 is not broken. As shown in FIG. 8, this problem does not arise for an anode terminal tab connected to the inside surface of the anode. However, as shown in FIG. 10, when the spiral electrode unit is inserted into the exterior package 11, the distance d between the exterior package 11 and the anode terminal tab 72 is shorter for an anode terminal tab that connects to the outer surface of the anode. This has the feature that when the spiral electrode unit is inserted into the exterior package 11, bending of the anode terminal tab is effectively prevented.

In the anode of embodiment No. 4 shown in FIG. 13, a terminal separating hole 138 is provided through one part of the lithium sheet anode under the L-shaped anode terminal tab 132. For this reason, when the battery is completely discharged as shown in FIG. 16, the connection between the anode terminal tab 162 and the lithium sheet in the outermost perimeter is broken, and deposition of active anode material onto the cathode 164 when battery power is overdrawn is prevented.

Further, a battery using the anode of embodiment No. 4 was discharged through a 200 Ω resistor at room temperature. The results indicated no recognizable reduction in battery power capacity for the battery of embodiment No. 4.

For the battery of embodiment No. 4, the terminal separating hole provided in the anode was 7 mm in diameter. However, the battery of this invention is not restricted to this size and shape terminal separating hole in the anode. Since the terminal separating hole separates the outer perimeter the anode from anode inside during the later stages of discharge, it is satisfactory for the terminal separating hole to be larger than the width of the anode terminal tab. It is desirable to adjust the diameter of the terminal separating hole to be within a range of 3 mm to 7 mm larger than the width of the anode terminal tab.

In this fashion, it is possible to have an anode terminal tab (mechanically) connected to the remaining anode after discharge, and to suppress deposition of residual anode on the cathode of a nonaqueous electrolyte battery with a spiral electrode unit having an outer periphery anode that separates (electrically) from the anode terminal tab. Further by disposing ion impervious insulator material at least over the inside surface of the anode opposite the end of the rolled cathode, a nonaqueous electrolyte battery that efficiently uses the anode is realized. Still further, by extracting the anode terminal tab from an electrodeless region of the spiral electrode unit outer turn, anode terminal tab bending due to vibration and tearing of the separator which causes internal shorts is prevented in addition to the previously mentioned effects. The industrial value of this cannot be underestimated.

We claim:

1. A nonaqueous electrolyte battery comprising
a spiral shaped electrode unit including:
a belt shaped cathode;
a belt shaped anode laminated on said cathode and adapted to be reduced in volume during a discharge reaction;
a separator laminated between said cathode and said anode;
wherein said cathode, said anode and said separator are rolled into a spiral shape, such that an outermost turn of said anode is located outwardly of an outermost turn of said cathode;
wherein an outermost end of said cathode protrudes circumferentially beyond an outermost end of said anode in an outwardly spiralling direction; and
wherein an anode terminal tab is connected to said anode at a position located at least one full turn of said anode from said outermost end of said anode in an inwardly spiralling direction.

2. A nonaqueous electrolyte battery as recited in claim 1, wherein
said electrode unit further includes an ion impervious insulator material disposed on a radially inwardly facing surface of said anode at a position along said anode opposite said outermost end of said cathode.

3. A nonaqueous electrolyte battery as recited in claim 1, further comprising
an exterior package containing said electrode unit;
wherein said exterior package acts as an anode terminal;
wherein said anode terminal tab is disposed on a radially inwardly facing surface of said anode;
wherein said anode terminal tab is insulated from an outermost turn of said anode; and
wherein said anode terminal pad includes an end portion which is extended away from said anode, said end portion of said anode terminal pad being connected with said exterior package at a location at which said cathode is not present at an outer periphery of said electrode unit.

4. A nonaqueous electrolyte battery as recited in claim 3, wherein
said anode terminal pad is L-shaped.

5. A nonaqueous electrolyte battery comprising
a spiral shaped electrode unit including:
a belt shaped cathode;

a belt shaped anode laminated on said cathode and adapted to be reduced in volume during a discharge reaction;

a separator laminated between said cathode and said anode;

wherein said cathode, said anode and said separator are rolled into a spiral shape, such that an outermost turn of said anode is located outwardly of an outermost turn of said cathode;

wherein an anode terminal tab is connected to said anode at a position located at least one full turn of said anode from an outermost end of said anode in an inwardly spiralling direction;

wherein an end portion of said anode terminal tab is connected to said anode but is otherwise insulated from said anode by an insulating material; and wherein a terminal separating hole, larger than a width of said anode terminal tab, is formed through said anode at a position at a boundary of said insulating material and adjacent the location where said anode terminal pad connects with said anode.

6. A nonaqueous electrolyte battery as recited in claim 5, wherein
said anode terminal pad is L-shaped.

* * * * *